United States Patent Office 3,704,317
Patented Nov. 28, 1972

3,704,317
PRODUCTION OF ACETIC ACID
Takashi Yamashita, Yugo Chida, Sadayoshi Ninagawa, and Tetsuya Kato, Kanagawa-ken, Japan, assignors to Ajinomoto Co., Inc., Tokyo, Japan
No Drawing. Filed Apr. 11, 1969, Ser. No. 816,060
Claims priority, application Japan, Apr. 26, 1968, 43/28,080
Int. Cl. C07c 53/08, 51/32
U.S. Cl. 260—533 R
14 Claims

ABSTRACT OF THE DISCLOSURE

Acetic acid is formed in high yield from iso-butene as well as from n-butene by gas phase oxidation using a vanadium catalyst containing one or more of the secondary elements Li, B, Si, Cr, Fe, Ni, Zn, Zr, Nb, Ru, Rh, Ta and Bi.

---

This invention relates to a process for producing acetic acid from butenes including iso-butene.

In the industrial production of acetic acid, it is known to oxidize ethylene in liquid phase to acetaldehyde which is further oxidized with air, and to oxidize $C_4$–$C_6$ paraffines in liquid phase in an acetic acid reaction medium. These known methods have the disadvantage of starting with relatively costly hydrocarbons.

The $C_4$ fraction of the conventional petroleum cracking processes is a mixture mainly consisting of butadiene, n-butene and iso-butene, and the waste remaining gas after recovering of the butadiene is used for fuel as LPG in a large quantity. Although some known processes produce acetic acid from this inexpensive raw material, they convert n-butene to acetic acid and require the separation of iso-butene from the gas (U.S. Pat. No. 3,362,987, also Belgian Pat. No. 677,753).

It has now been found that acetic acid can be obtained in a high yield not only from n-butene but also from iso-butene and propylene which is frequently contained in the waste gas, when a catalyst containing vanadium and other specific elements is used in the gas phase oxidation of the raw materials.

This invention is characterized by gas phase oxidation of butenes including iso-butene with oxygen or gases containing oxygen in the presence of steam and of a catalyst whose effective elements are vanadium and one or more elements selected from the group consisting of lithium, boron, silicon, chromium, iron, nickel, zinc, zirconium, niobium, ruthenium, rhodium, palladium, tantalum and bismuth.

The most effective secondary elements are lithium, boron, chromium, zinc, zirconium, niobium, ruthenium, palladium and tantalum. The catalyst of the invention is prepared by calcining a mixture of a vanadium compound with a compound of a secondary element or by mixing a calcined vanadium compound with a calcined compound of a secondary element. For instance, the catalyst is obtained by mixing vanadium pentoxide with the oxide of the secondary element and calcining the mixture, followed by granulating to suitable grain size; or by mixing a solution of a vanadium salt (for example, vanadium chloride) with a solution of a compound of the secondary element and obtaining solid material containing the effective two elements by precipitation or evaporation, followered by calcination. A supported catalyst may be prepared by precipitating oxides of said two effective elements on a chemically inactive carrier, such as α-alumina, silica, titanium oxide, Celite, diatomaceous earth and carborundum, in the usual way.

The optimum atom ratio of each secondary element to vanadium in the catalysts varies according to the secondary element. When the element is lithium, iron, zinc, rhodium, palladium or bismuth, the ratio is generally in the range of 0.005–0.55; that of lithium, zinc or bismuth to vanadium is preferably 0.05–0.25, that of calcium, iron, rhodium and palladium is 0.05–0.20, 0.10–0.55, 0.05–0.45 and 0.005–0.04, respectively; and when the element is boron, silicon, chromium, nickel, zirconium, niobium or tantalum, the optimum atom ratio of the element to vanadium is generally in the range of 0.05–9.00, particularly that of nickel or niobium is preferably 0.40–1.50 and that of boron, silicon, chromium, zirconium and tantalum is preferably 0.10–2.50, 0.10–2.50, 0.10–9.00, 0.40–2.50 and 0.05–1.50, respectively. When the ratio becomes larger than the range above-mentioned, complete oxidation of butenes to $CO_2$ or other by-products increases and it becomes difficult to achieve a high yield of acetic acid.

The process of this invention, may otherwise be carried out as is conventional procedure in gas phase oxidation. A gaseous mixture of butenes including iso-butene with oxygen or gases containing oxygen and with steam is contacted with the catalyst kept in a fixed bed or fluid bed at a high temperature. Although the optimum reaction temperature somewhat varies according to the catalyst composition, it is generally in the range of 180–360° C., preferably 220–350° C.

Although the theoretically necessary amount of oxygen is 2.0 moles per mole of butenes (n-butene and iso-butene), it is desirable to employ 3.0–10 moles of oxygen per mole of butenes in order to complete the oxidation in one pass. When the unreacted gas is recycled to the reactor, an amount of oxygen smaller than the range above-mentioned is enough, but such recycle operation is not economical.

An excess amount of steam does not inhibit the reaction, but the larger amount of steam makes the recovery of acetic acid more costly. With insufficient steam, the complete oxidation of butenes increases and the yield of acetic acid decreases. The lower limit depends upon the amount of oxygen employed with the steam. For instance, when the mole ratio of oxygen to butenes is 6.5, the lower limit of the mole ratio of steam to butenes is about 6; and when that of oxygen to butenes is 3.0, that of steam to butenes is about 15. The larger amount of oxygen makes the use of a smaller amount of steam possible. In general, the use of 4–12 moles of steam per mole of butenes is economical. If the recycle operation is employed, an amount of steam smaller than the above-mentioned range may be used, but the process is not economical.

The dwell time in contact with the catalyst is usually 0.5–4 seconds, and recycling the reacted gas is unnecessary because the reaction substantially goes to completion within mentioned dwell time.

After the reaction, acetic acid can be recovered by means of conventional procedures; i.e., by quenching the reacted gas to condense the acetic acid with by-products, such as maleic acid, acetaldehyde, methacrylic acid, acetone, citraconic acid, formaldehyde and formic acid, followed by extraction or fractional distillation of the condensate. Acetaldehyde and acetone recovered from the reaction gas may be converted to acetic acid by recycling to the reactor.

According to the present invention, iso-butene can be converted to acetic acid in a high yield, and separation of iso-butene from the gaseous raw materials is unnecessary. The yield of acetic acid based on the starting butenes is high, and the yields of by-products are low.

The invention is illustrated by the following examples. In each example the catalyst consisted of a mixture of one volume of the active composition with three volumes of quartz powder and put into a Pyrex glass tube of 25 mm. diameter and 100 mm. length to form a conventional fixed bed reactor heated by an electric heater.

EXAMPLE 1

0.433 g. lithium chloride were dissolved in aqueous ammonia and 10.56 g. ammonium matevanadate were added with stirring. The mixture wah evaporated to dryness and calcined at 500° C. for 5 hours in an electric furnace. Then, the calcined mixture was moulded and ground to powder of 16–30 mesh.

Method I: 4 ml. of the catalyst were put into the Pyrex tube and 5 l./hr. of air containing n-butene and iso-butene in an amount of 1.5 vol. percent each were passed through the reactor at 330° C. together with 6 ml./hr. of water.

Method II: 4 ml. of catalyst were put into the Pyrex tube, and 5 l./hr. of air containing 3 vol. percent isobutene were passed through the reactor at 300° C. together with 6 ml./hr. of water.

Method III: 4 ml. of the catalyst were put into the tube and 10 l./hr. of air containing 3 vol. percent n-butene were passed through the reactor at 345° C. togeher with 6 ml./hr. of water.

When the activity of the catalyst became constant in each method, the products in the effluent gas were quantitatively analyzed and conversion of the butene, and yields of acetic acid (AcOH), maleic acid (MA), acetaldehyde (AcH) methacrylic acid (MCA), carbon monoxide (CO) and of carbon dioxide ($CO_2$) were determined. The results were as follows:

| Method | Conversion (percent) | Yield (percent) | | | | |
|---|---|---|---|---|---|---|
| | | AcOH | MA | AcH | MCA | (CO+$CO_2$) |
| I | {i-Bu 98.0 / n-Bu 95.5} | 41.0 | 5 | Trace | 7 | |
| II | 90.0 | 40.5 | | Trace | 15.5 | 42 |
| III | 99.0 | 42.3 | 8.8 | 6.1 | | 43 |

In the Methods I and II, a small amount of acetone was produced.

EXAMPLE 2

8.23 g. of ammonium metavanadate were dissolved in an aqueous solution containing 9.0 g. of oxalic acid, and a solution prepared by dissolving 7.0 g. of chromic anhydride in 10 ml. water was added. The mixture was evaporated to dryness. The residue was worked up as described in Example 1. The following experiments were carried out by the procedure described in Example 1, using 4 ml. of the catalyst.

The procedure of Method I was repeated varying the temperature to 260° C. The conversions of iso-butene and n-butene were 93.0% and 96%, respectively. The yields of AcOH, MA, and MCA were 54.0%, 3% and 4%, respectively. Further, AcH and acetone were each produced in a small amount.

The procedure of Method II was repeated varying the temperature and the flow rate of water to 275° C., and 5 ml./hr., respectively. The conversion of isobutene was 98.8% and the yields of AcOH, AcH and MCA, which are liquid at ordinary temperatures were 45.5%, 5.8% and 5.8%, respectively. Trace amounts of metacrolein and acetone were produced and the bulk of the remaining gas was CO and $CO_2$.

In a manner analogous to the above, 10 l./hr. of air containing 3 vol. percent propylene and 12 ml./hr. of water were passed through the reactor at 335° C., the conversion of propylene was 82.2%, and the yields of AcOH and AcH were 38.5% and 6.1%, respectively.

Further, when the reaction temperature was 300° C., the conversion of propylene was 59.8% and the yields of AcOH and AcH were 46.5% and 6.1%, respectively.

When the procedure of Method III was repeated decreasing the flow rates of the raw gas and water to ½ and varying the temperature to 255° C., the conversion of n-butene was 93%, and the yields of AcOH, MA and AcH were 63.9%, 5.2% and 13.6%, respectively. The total yield of CO and $CO_2$ was 17.3%.

EXAMPLE 3

To 5 ml. of water, 3.50 g. of vanadium pentoxide were added and to the dispersion obtained 7.2 g. of oxalic acid were gradually added at 80–90° C. to obtain an aqueous solution of vanadyl oxalate. The solution was mixed with a solution prepared by dissolving 22.2 g. of chromic acetate in 30 ml. of water with heating, and the mixture was evaporated to dryness. The residue was worked up by the procedure described in Example 1.

Using 4 ml. of the catalyst, respectively, the Methods I, II and III described in Example 1 were repeated varying the reaction temperature to those shown below and the following results were obtained:

| Method (temp.) | Conversion (percent) | Yield (percent) | | | |
|---|---|---|---|---|---|
| | | AcOH | MA | AcH | (CO+$CO_2$) |
| I (280° C.) | 99.6 | 50.0 | 1.0 | 1.5 | 37 |
| II (285° C.) | 100 | 44.2 | | 1.0 | 46 |
| III (275° C.) | 99.4 | 59.7 | 2.0 | 2.0 | 24 |

EXAMPLE 4

To 5 ml. of water, 3.15 g. of vanadium pentoxide were added and to the dispersion obtained 6.5 g. of oxalic acid were gradually added at 80–90° C. The solution was mixed with a solution prepared by dissolving 20 g. of chromic acetate in 30 ml. of water with heating, and 19.3 g. of 20 wt. percent aqueous solution of silica sol were added dropwise to the mixture while stirring to obtain a homogeneous sol solution. The sol solution was evaporated to dryness and was treated as described in Example 1.

Using 4 ml. of the catalyst, respectively, the procedures of Methods I, II and III were repeated varying the temperature and reducing the flow rate of water 2.2 ml./hr. The results are listed below:

| Method (temp.) | Conversion (percent) | Yield (percent) | | | | |
|---|---|---|---|---|---|---|
| | | AcOH | MA | AcH | MCA | (CO+$CO_2$) |
| I (296° C.) | 99.8 | 52.0 | 1.5 | 1.5 | 1.8 | 31.0 |
| II (306° C.) | 99.8 | 46.5 | | 2.3 | 3.9 | 35.0 |
| III (290° C.) | 100 | 56.0 | 3.4 | 1.5 | | 26.0 |

EXAMPLE 5

A solution prepared by dissolving 7.31 g. of vanadium pentoxide in concentrated hydrochloric acid was mixed with a solution prepared by dissolving 3.44 g. of rhodium chloride ($RhCl_3 \cdot 3H_2O$) in concentrated hydrochloric acid, and the mixture was evaporated to dryness with stirring. The residue was treated as in Example 1.

8 ml. of the catalyst were put into a tube, and 10 l./hr. of air containing 3 vol. percent iso-butene and 12 ml./hr. of water were passed through the reactor at 305° C. The conversion of iso-butene was 97.2% and the yields of AcOH, AcH and MCA were 47.8%, 3% and 4.8%, respectively. At the same time, trace amounts of metacrolein and acetone were produced, and the bulk of the remainder was CO and $CO_2$.

Using 4 ml. of the catalyst, the procedure of Method III was repeated varying the temperature to 260° C. The conversion of n-butene was 94.8%. The yields of AcOH, MA, AcH and (CO+$CO_2$) were 59.7%, 0.3%, 18.2% and 24%, respectively.

EXAMPLE 6

Vanadium pentoxide was mixed with enough zinc oxide prepared by pyrolysis of zinc carbonate, to form a mixture in which the atom ratio of vanadium to zinc was 18:1. The mixture was calcined at 450° C. for 5 hours, moulded and ground to powder of 16–30 mesh.

Using the catalyst, the procedures of Methods II and III were repeated varying the temperature. The results are as follows:

| Method (temp.) | Conversion (percent) | Yield (percent) | | | | |
|---|---|---|---|---|---|---|
| | | AcOH | MA | AcH | MCA | (CO+$CO_2$) |
| II (268° C.) | 99.5 | 40 | | 4.5 | 4.1 | 50 |
| III (225° C.) | 82 | 51.8 | 15 | 11 | | 22 |

EXAMPLE 7

In 20 ml. of water, 4.84 g. of boric acid were dissolved with heating and 9.36 g. of ammonium metavanadate were further added. The mixture was evaporated to dryness with stirring. The residue was heated gradually to 200° C., and calcined at 500° C. for 5 hours. Then the calcined material was ground to powder of 16–30 mesh.

The procedure of Method II was repeated using 8 ml. of the catalyst doubling the flow rate of air (10 ml./hr.) and also varying the temperature. Further, the Method III was repeated varying the temperature. The results are as follows:

| Method (temp.) | Conversion (percent) | Yield (percent) | | | | |
|---|---|---|---|---|---|---|
| | | AcOH | MA | AcH | MCA | (CO+$CO_2$) |
| II (305° C.) | 97.5 | 43 | | 1.5 | 6.6 | 46 |
| III (280° C.) | 97 | 58.6 | 15.8 | 12 | | 14 |

EXAMPLE 8

A solution prepared by dissolving 5.46 g. of vanadium pentoxide in concentrated hydrochloric acid with heating was mixed with a solution prepared by dissolving 14.04 g. of zirconium chloride in 40 ml. of water. The mixed solution was neutralized with concentrated aqueous ammonia. The precipitate formed was separated from the liquid, washed with water and calcined at 500° C. for 5 hours. The calcined material was ground to powder of 16–30 mesh and used in the following experiments as the catalyst.

The procedures of Methods II and III were repeated varying the temperature. The results are as follows:

| Method (temp.) | Conversion (percent) | Yield (percent) | | | | |
|---|---|---|---|---|---|---|
| | | AcOH | MA | AcH | MCA | (CO+$CO_2$) |
| II (285° C.) | 96.2 | 41 | | | 3 | 55 |
| III (260° C.) | 87 | 43 | 6.3 | 11.5 | | 38 |

EXAMPLE 9

A solution prepared by dissolving 8.19 g. of vanadium pentoxide in concentrated hydrochloric acid with heating was mixed with a solution prepared by dissolving 3.15 g. of bismuth trichloride in concentrated hydrochloric acid, and the solution was neutralized with concentrated aqueous ammonia. The precipitate formed was separated from the liquid wished with water and calcined at 500° C. for 5 hours. The calcined material was ground to a powder of 15–30 mesh and used in the following experiments as the catalyst.

The procedures of Methods II and III were repeated varying the temperature. The results are as follows:

| Method (temp.) | Conversion (percent) | Yield (percent) | | | | |
|---|---|---|---|---|---|---|
| | | AcOH | MA | AcH | MCA | (CO+$CO_2$) |
| II (322° C.) | 98.0 | 37 | | | 6.7 | 39 |
| III (330° C.) | 94.5 | 44 | 14 | 16 | | 26 |

EXAMPLE 10

A solution prepared by dissolving 8.20 g. of vanadium pentoxide in concentrated hydrochloric acid with heating was mixed with a solution prepared by dissolving 2.70 g. of ferric chloride ($FeCl_3 \cdot 6H_2O$) in concentrated hydrochloric acid, and the solution was neutralized with concentrated aqueous ammonia, then evaporated to dryness with stirring. The residue was calcined at 500° C. for 5 hours, ground to powder of 16–30 mesh, and used in the following experiments as the catalyst.

The procedures of Methods II and III were repeated varying the temperature. The results are as follows.

| Method (temp.) | Conversion (percent) | Yield (percent) | | | | |
|---|---|---|---|---|---|---|
| | | AcOH | MA | AcH | MCA | (CO+$CO_2$) |
| II (275° C.) | 88 | 42 | | | 12.3 | 83 |
| III (285° C.) | 96.4 | 41 | 13 | 11 | | 32 |

EXAMPLE 11

A solution prepared by dissolving 5.46 g. of vanadium pentoxide in a mixture of 7.28 g. of ethanolamine and 10 ml. of water, was added all at once to a solution prepared by dissolving 14.15 g. of nickel chloride in 150 ml. of water, and the mixture was stirred. The precipitate formed was recovered, washed with water, calcined at 450° C. for 5 hours, ground to powder of 16–30 mesh, and used in the following experiments.

The procedures of Methods II and III were repeated varying the temperature. The results are as follows:

| Method (temp.) | Conversion (percent) | Yield (percent) | | | | |
|---|---|---|---|---|---|---|
| | | AcOH | MA | AcH | MCA | (CO+CO₂) |
| II (295° C.) | 93.8 | 38.2 | | | 11.3 | 48 |
| III (270° C.) | 87 | 44.2 | 9.5 | 5.3 | | 26 |

EXAMPLE 12

A solution prepared by dissolving 5.46 g. of vanadium pentoxide in hot concentrated hydrochloric acid was mixed with a solution prepared by dissolving 7.97 g. of niobium pentoxide in hot concentrated hydrochloric acid, and the mixture was neutralized with concentrated aqueous ammonia. The recovered precipitate was washed with water, calcined at 500° C. for 5 hours, ground to powder of 16–30 mesh, and used in the following experiments as the catalyst.

The procedures of methods II and III were repeated varying the temperature. The results are as follows:

| Method (temp.) | Conversion (percent) | Yield (percent) | | | | |
|---|---|---|---|---|---|---|
| | | AcOH | MA | AcH | MCA | (CO+CO₂) |
| II (275° C.) | 96.2 | 42.3 | | | 3.2 | 42 |
| III (290° C.) | 96 | 46.9 | 3.8 | 15.7 | | 27 |

EXAMPLE 13

A solution prepared by dissolving 10.82 g. of vanadium pentoxide in hot concentrated hydrochloric acid was mixed with a solution prepared by dissolving 0.177 g. of palladium chloride in concentrated hydrochloric acid, and the mixed solution was gradually evaporated to dryness. The residue was calcined at 400° C. for 5 hours, ground to powder of 16–30 mesh and used in the following experiments as the catalyst.

Into a tube, 4 ml. of the catalyst were put, and the catalyst was activated by passing through the tube 10 l./hr. of air containing n-butene and iso-butene in 2.4 vol. percent and 0.6 vol. percent, respectively, together with 12 ml./hr. of water for 15 hours.

When the activity of the catalyst became constant, the conversion of the butenes was 89% and the yields of AcOH, MA and AcH were 45%, 4.2% and 2%, respectively. A trace amount of MCA was also produced. The total yield of CO and CO₂ was 45%.

When the procedure of method III was repeated varying the temperature to 260° C., the conversion of n-butene was 93% and the yields of AcOH and MA were 46.5% and 5.5%, respectively.

EXAMPLE 14

A solution prepared by dissolving 7.28 g. of vanadium pentoxide in 50 ml. of concentrated hydrochloric acid with heating was mixed with a solution prepared by dissolving 7.24 g. of hot tantalum pentoxide in a small amount of concentrated hydrochloric acid, and the mixed solution was gradually neutralized with concentrated aqueous ammonia with stirring. The precipitate was recovered by centrifugal separation, washed with water, calcined at 500° C. for 5 hours, and ground to powder of 16–30 mesh.

The first-described procedure of Example 11 was followed in using the catalyst so obtained at 315° C. The conversion of the butenes was 89% and the yields of AcOH, MA and AcH were 49.3%, 12% and 15%, respectively. A trace amount of MCA was produced and the total yield of CO and CO₂ was 24%.

EXAMPLE 15

An aqueous solution containing 11.10 g. of sodium silicate was acidified to pH 3–4 with 2 normal hydrochloric acid and the solution was left to stand for one day. The gel formed was washed with distilled water with stirring until chlorine ion disappeared, and an aqueous solution containing 7.02 g. ammonium vanadate and 11.2 g. of oxalic acid was added to the gel. The mixture was evaporated to dryness with stirring and the residue was calcined at 500° C. for 5 hours, and ground to powder of 16–30 mesh.

The procedure of Example 14 was repeated in using the catalyst obtained at 305° C. The conversion of the butenes was 95% and the yields of AcOH, MA and AcH were 43%, 11% and 10 %, respectively. The total yield of CO and CO₂ was 40%. Further, a small amount of MCA was produced.

What we claim is:

1. A method of producing acetic acid which comprises contacting isobutene in a gaseous medium with oxygen and water at a temperature of 180° to 360° C. and for a period sufficient to convert a portion of said isobutene to acetic acid, said isobutene being contacted with said oxygen and water in the presence of a catalyst prepared by calcining an intimate mixture of an oxide or salt of vanadium with an oxide or salt of a secondary element of the group consisting of lithium, boron, silicon, chromium, iron, nickel, zinc, zirconium, niobium, palladium, ruthenium, rhodium, tantalum, and bismuth at a temperature of at least 400° C.

2. A method as set forth in claim 1, wherein said acetic acid is recovered.

3. A method as set forth in claim 1, wherein said gaseous medium contains n-butene, a portion of said n-butene being converted to acetic acid during said period.

4. A method as set forth in claim 3, wherein said secondary element is lithium, boron, chromium, zirconium, niobium, ruthenium, palladium, or tantalum.

5. A method as set forth in claim 3, wherein the mole ratio of said oxygen to the combined amount of said isobutene and said n-butene is between 3.0:1 and 10:1, the mole ratio of said water vapor to said combined amount is between 4:1 and 12:1, and said period is 0.5 to 4 seconds.

6. A method as set forth in claim 1, wherein said secondary element is lithium, iron, zinc, rhodium, palladium, or bismuth, and the atom ratio of said secondary element to vanadium in said catalyst is 0.0005:1 to 0.55:1.

7. A method as set forth in claim 6, wherein said secondary element is lithium, zinc, or bismuth, and said ratio is 0.05:1 to 0.25:1.

8. A method as set forth in claim 6, wherein said secondary element is palladium and said ratio is 0.005:1 to 0.04:1.

9. A method as set forth in claim 1, wherein said secondary element is boron, silicon, chromium, nickel, zirconium, niobium, or tantalum, and the atom ratio of said secondary element to vanadium in said catalyst is 0.05:1 to 9:1.

10. A method as set forth in claim 9, wherein said secondary element is boron, and said ratio is 0.10:1 to 2.50:1.

11. A method as set forth in claim 9, wherein said secondary element is chromium, and said ratio is 0.10:1 to 9:1.

12. A method as set forth in claim 9, wherein said secondary element is zirconium, and said ratio is 0.40:1 to 2.50:1.

13. A method as set forth in claim 9, wherein said secondary element is niobium, and said ratio is 0.40:1 to 1.50:1.

14. A method as set forth in claim 9, wherein said secondary element is tantalum, and said ratio is 0.05:1 to 1.50:1.

References Cited

UNITED STATES PATENTS

| | | | |
|---|---|---|---|
| 3,600,443 | 8/1971 | Cervidalli et al. | 260—537 R X |
| 3,431,297 | 3/1969 | Brockhaus | 260—533 |
| 3,439,029 | 4/1969 | Brockhaus | 260—533 |
| 3,459,797 | 8/1969 | Brockhaus et al. | 260—533 |
| 3,057,915 | 10/1962 | Rienenschneider et al. | 260—533 |

FOREIGN PATENTS

| | | | |
|---|---|---|---|
| 1,527,716 | 7/1968 | France | 260—533 |
| 971,100 | 9/1964 | United Kingdom | 260—533 |
| 990,639 | 4/1965 | United Kingdom | 260—533 |

LORRAINE A. WEINBERGER, Primary Examiner

R. D. KELLY, Assistant Examiner

U.S. Cl. X.R.

252—432, 456, 461, 467, 472, 476, 464; 260—604 R, 604 AC